United States Patent
Stocker

(10) Patent No.: US 6,884,533 B2
(45) Date of Patent: Apr. 26, 2005

(54) UTILIZATION BASED POWER PLANT CONTROL SYSTEM

(75) Inventor: W. Gregg Stocker, New Westminster (CA)

(73) Assignee: Ballard Generation Systems, Burnaby (CA)

( * ) Notice: Subject to any disclaimer, the term of this patent is extended or adjusted under 35 U.S.C. 154(b) by 503 days.

(21) Appl. No.: 10/161,579

(22) Filed: May 31, 2002

(65) Prior Publication Data

US 2003/0224230 A1 Dec. 4, 2003

(51) Int. Cl.[7] .............................................. H01M 8/04
(52) U.S. Cl. ............................ 429/23; 429/22; 429/13; 429/17
(58) Field of Search .............................. 429/22, 23, 13, 429/17

(56) References Cited

U.S. PATENT DOCUMENTS

| | | | | |
|---|---|---|---|---|
| 4,904,548 | A | * 2/1990 | Tajima | 429/22 |
| 5,333,591 | A | 8/1994 | Korsmeier et al. | 123/527 |
| 5,637,414 | A | 6/1997 | Inoue et al. | 429/13 |
| 5,712,052 | A | 1/1998 | Kawatsu | 429/13 |
| 6,083,637 | A | 7/2000 | Walz et al. | 429/17 |
| 6,290,913 | B1 | * 9/2001 | Aoyama | 422/110 |
| 6,589,679 | B1 | * 7/2003 | Acker et al. | 429/22 |
| 6,632,552 | B1 | * 10/2003 | Yamanashi | 429/17 |
| 6,761,988 | B1 | * 7/2004 | Acker et al. | 429/23 |
| 6,777,123 | B1 | * 8/2004 | Okamoto | 429/24 |
| 6,783,879 | B1 | * 8/2004 | Skala et al. | 429/17 |

FOREIGN PATENT DOCUMENTS

WO    WO 01/43216 A2    6/2001

OTHER PUBLICATIONS

English Abstract of JP2001325975, esp@cenet, http://ep.espacenet.com/, Nov. 22, 2001.
English Abstract of JP2001332284, esp@cenet, http://ep.espacenet.com/, Nov. 30, 2001.

* cited by examiner

Primary Examiner—Bruce F. Bell
(74) Attorney, Agent, or Firm—Seed IP Law Group PLLC

(57) ABSTRACT

Systems and methods of controlling fuel cell electric power generation systems. In one embodiment, the control system comprises a current detector for measuring an output current of the fuel cell stack and generating a corresponding current signal, a flow detector for measuring a flow rate of a process gas stream and generating a corresponding flow rate signal, a sensor for measuring a concentration of a component of the reformate stream and generating a corresponding concentration signal, and a processor. The processor is configured to maintain hydrogen utilization in the fuel cell stack at about a user selectable value or within a user selectable range by generating an output signal as a function of the current signal, the flow rate signal and the first concentration signal. The output signal is employed in controlling a process variable impacting hydrogen utilization.

49 Claims, 3 Drawing Sheets

UTILIZATION BASED POWER PLANT CONTROL SYSTEM

BACKGROUND OF THE INVENTION

1. Field of the Invention

The present invention relates to fuel cell electric power generation systems and methods and systems of controlling the same.

2. Description of the Related Art

In a fuel cell power generation system, hydrogen and oxygen supplied to the fuel cell stack are converted into electric power. Many such systems employ a hydrocarbon fuel as the hydrogen source. The fuel must be processed to convert it to a hydrogen rich stream. Various embodiments of fuel processing systems are employed to process the fuel, which commonly comprise a reformer, and other components such as shift reactors and selective oxidizers.

Typical reformers employed in such fuel processing systems include steam reformers, partial oxidation reformers (POX) and autothermal reformers (ATR). In steam reformers, for example, the fuel and steam are directed to one or more reformer tubes containing a steam reforming catalyst and converted into a hydrogen rich reformate stream. The steam reforming process is highly endothermic, and is normally carried out at elevated catalyst temperatures in the range from about 650° C. to about 875° C. Such elevated temperatures are typically generated by the heat of combustion from a burner incorporated in the reformer. The reformate stream is often then delivered to a shift reactor and a selective oxidizer, and then to an anode inlet passage of the fuel cell stack to be consumed in the stack.

A majority of hydrogen in the reformate stream is utilized in the fuel cell stack to generate electrical energy. However, operating the fuel cell system at very high hydrogen utilization (i.e. above 90% to 95%) can result in fuel starvation conditions at some portions of the fuel cell stack. Fuel starvation conditions increase the risk of cell voltage reversal occurring in one or more cells in the stack, which can cause damage to membrane electrode assembly (MEA) components, deteriorating the performance of the affected cells and resulting in shortened service time of the stack.

Additionally, in power generation systems that employ steam reformers, anode exhaust gas is commonly supplied as fuel to the reformer burner. Thus it is desired to maintain a sufficient level of unconsumed hydrogen in the anode exhaust for the burner to supply enough heat to the reforming catalyst to support the desired rate of reaction. An insufficient supply of hydrogen to the burners can result in undesirably low reaction rates in the reformer as well as burner flame-out.

Low hydrogen utilization can also be problematic. When hydrogen utilization is low in the fuel cell stack there is excess hydrogen in the anode exhaust gas, which can result in higher reformer temperatures. Higher reformer temperatures tend to increase the fuel conversion rate in the reformer, however, higher temperatures also increase the concentration of carbon monoxide in the reformate. The concentration of carbon monoxide can increase beyond the capacity of downstream fuel processing components resulting in carbon monoxide "slip" to the stack and poisoning of the anode catalyst. With heavier fuels, higher reformer temperatures can also cause coking and carbon formation on the catalyst. Furthermore, at higher reformer temperatures there is an increased risk of damage to the reformer components, including sintering of the catalyst and thermal stress/damage to reformer components.

Thus, the hydrogen requirements of the fuel cell stack and the fuel processing system should be matched for optimal performance of the power generation system. For power generation systems employing steam reformers, for example, hydrogen utilization of about 80% to 85% in the stack is an optimal utilization range. This helps avoid fuel starvation conditions in the stack and supplies sufficient hydrogen to the reformer burner to maintain the desired steam reforming reaction rate.

U.S. Pat. Nos. 3,585,078 and 5,009,967 describe methods of reformer fuel control for controlling the flow rate of a reformate stream to a fuel cell. Both patents disclose regulating the fuel stream flow to the reformer as a function of the fuel cell current and biasing the fuel stream flow rate as a function of the temperature of the reformer. In general, an output current of the fuel cell stack is monitored and processed to determine an initial fuel stream flow rate set point, and to regulate the flow rate accordingly. Second, an empirical model is employed that provides a desired operating temperature, given the measured current load. The desired operating temperature correlates to estimated hydrogen utilization through the fuel cell stack. U.S. Pat. No. 5,009,967 describes attaining an operating temperature in the reformer correlating to 80% hydrogen utilization in the fuel cell stack. The flow rate of the fuel stream is biased to eventually achieve the desired temperature set point. The two-stage control is complicated, requiring an initial set point and an ultimate set point, and response time could be slow. This is particularly problematic for load-following applications, where the desired fuel cell output varies in response to changing load requirements.

Other control methods involve regulating the fuel stream flow to the reformer based on a predetermined reformate composition as a function of the temperature of the reformer. For example, a predicted or empirically determined reformate composition at the measured reformer temperature can be used to estimate the amount of hydrogen supplied to the fuel cell stack. Typically, such methods use a look-up table of reformate compositions over the operating temperature range of the reformer, calculating a hydrogen supply rate to the stack based on the expected reformate composition at the measured reformer temperature. These control methods have several disadvantages. One disadvantage is that the fuel processing system typically includes more than one component, and the output of each component can vary with process conditions. Thus, the predetermined reformate composition may or may not correspond to the actual reformate condition, depending on the output of other components. Another disadvantage is that the performance of each of the fuel processing components changes over time, increasing the difference between the predicted and actual reformate compositions. This change in performance necessitates updating the look-up tables regularly, or modelling the change in performance in the control system. As a result, such control methods are complicated and generally do not provide a desirable degree of accuracy. Again, these problems are aggravated in load-following applications.

Available means of providing control of hydrogen utilization in fuel cell power generation systems rely on complicated control schemes. It is thus desirable to provide a control system and method with fast response rates and for maintaining hydrogen utilization rate in a desired range.

BRIEF SUMMARY OF THE INVENTION

Fuel cell electric power generation systems are provided, as are methods and apparatus for controlling them. The power generation system comprises a reformer for converting a fuel supply stream to a hydrogen rich reformate stream and a fuel cell stack fluidly connected to the reformer to receive the hydrogen rich reformate stream. In one embodiment, the control system comprises:

a current detector for measuring an output current of the fuel cell stack and generating a corresponding current signal;

a first flow detector for measuring a first flow rate of a process gas stream and generating a corresponding first flow rate signal;

a first sensor for measuring a concentration of a first component of the reformate stream and generating a corresponding first concentration signal; and a processor configured to maintain hydrogen utilization in the fuel cell stack at about a user selectable value or within a user selectable range by generating an output signal as a function of the current signal, the flow rate signal and the first concentration signal, the output signal being for use in controlling a process variable impacting hydrogen utilization.

In another embodiment, the control system comprises:

a current detector for measuring an output current of the fuel cell stack;

a flow detector for measuring a flow rate indicative of a fuel flow rate into the reformer;

a methane sensor for measuring methane concentration in the reformate stream; and a processor for determining hydrogen utilization in the fuel cell stack using signals from the current detector, flow detector, and methane sensor, and for comparing the determined hydrogen utilization against a selectable value and generating a processor signal for adjusting a control variable impacting hydrogen utilization, the processor signal being generated as a function of a difference between the selectable value and the determined hydrogen utilization.

In one embodiment, the fuel cell power generation system comprises:

a reformer with an inlet passage for receiving a fuel stream and an outlet passage to allow reformate stream to exit the reformer;

a fuel cell stack with an anode inlet passage fluidly connected to the outlet passage of the reformer;

a methane sensor for measuring a concentration of methane in the reformate stream;

a flow detector for measuring a flow rate of one of the fuel stream and reformate stream;

a current detector for measuring an output current of the fuel cell stack; and a controller configured to process a signal from the methane sensor, a signal from the flow measurement device, and a signal from the current sensor to control a process variable with the result of maintaining hydrogen utilization in the fuel cell stack at approximately one of a selectable value or selectable range.

In one embodiment, the method of controlling a fuel cell electric power generation system comprises:

measuring a flow rate of the fuel stream or the reformate stream;

measuring a methane concentration of the reformate stream using an IR methane sensor;

calculating a maximum allowable output current using the measured flow rate and the methane concentration of the reformate stream;

measuring the output current of the fuel cell stack; and adjusting the output current of the fuel cell stack to approximately match the maximum allowable output current.

Another embodiment comprises:

measuring a flow rate of the fuel stream or the reformate stream;

measuring a methane concentration of the reformate stream using an IR methane sensor;

measuring an output current of the fuel cell stack;

selecting a hydrogen utilization for the fuel cell stack;

determining a flow rate set point necessary to achieve the selected hydrogen utilization based on the output current and methane concentration; and adjusting the flow rate of one of the fuel stream and reformate stream to approximate the flow rate set point.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
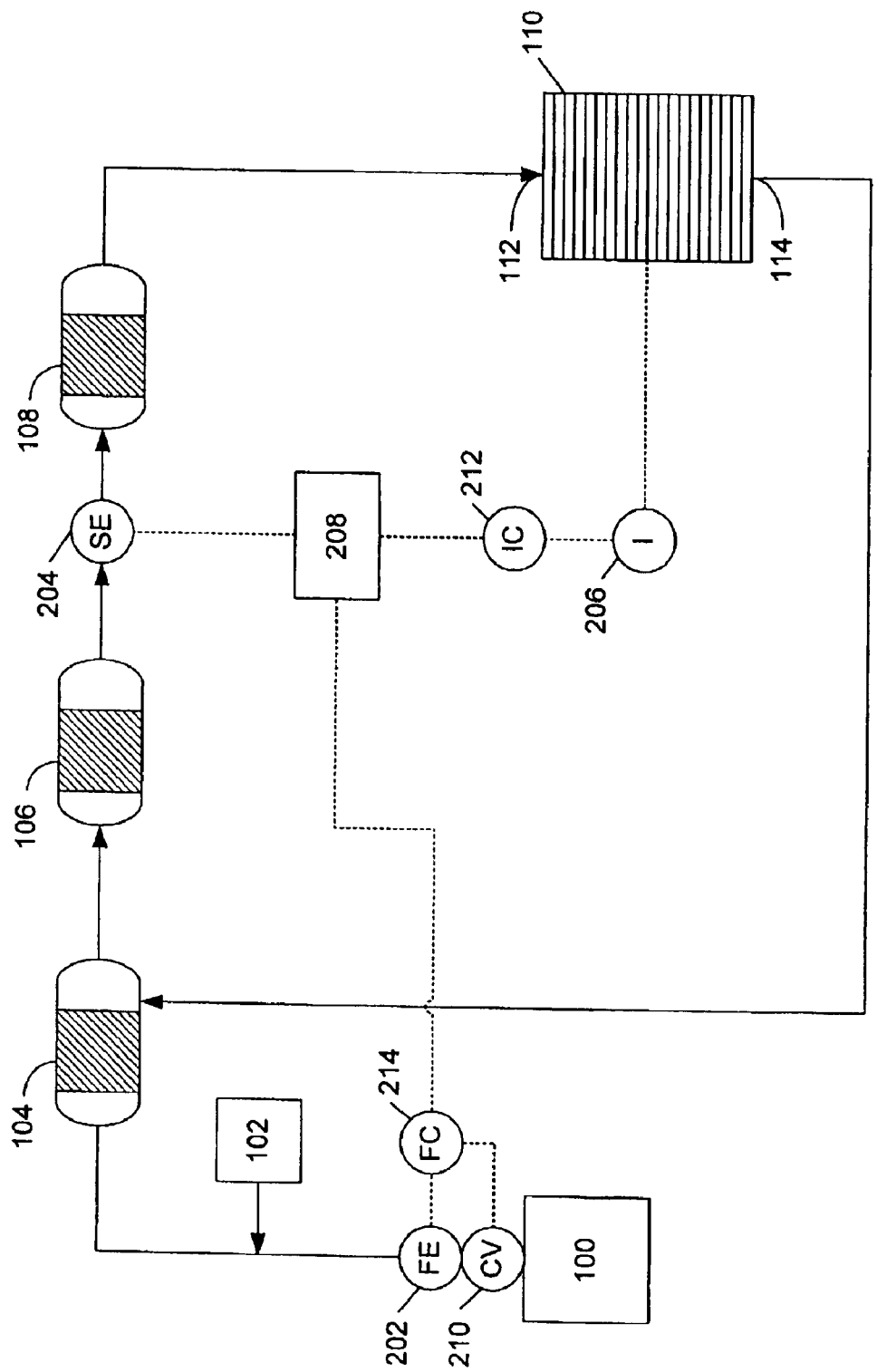
FIGS. 1–3 are simplified process flow and process control diagrams for several embodiments of the present fuel cell stack power generation system and control system.

In the following description, certain specific details are set forth in order to provide a thorough understanding of various embodiments of the invention. However, one skilled in the art will understand that the invention may be practiced without these details. In other instances, well known structures associated with fuel cells stacks, sensors, power generation control systems, and fuel processing systems have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

In various portions of this description, background information is provided for purposes of clarity. However, there is no intent to be bound by any theory set forth.

Fuel cell electric power generation systems are provided, as are methods and apparatus for controlling them. Process variables measured by the control system include the output current of the fuel cell stack, the flow rate of a process gas in the fuel processing system, and the concentration of a component in the reformate stream. These process variables can be used in various control scheme embodiments to provide a way of controlling the power generation system and maintaining hydrogen utilization in a desired range. To achieve this, mass balance relationships between the process variables are used. In order to provide the reader with framework for a better understanding of these balance relationships in the context of certain embodiments of the power generation system, some background is provided as to chemical reactions used in the balances.

A fuel, as defined herein, can comprise a hydrocarbon or hydrocarbon mixture in gaseous or liquid form. Examples of such hydrocarbons and hydrocarbon mixtures include, but are not limited to, natural gas, naphtha, gasoline, diesel, ethane, butane, light distillates, dimethyl ether, methanol, ethanol, propane, and kerosene.

In steam reforming, the fuel and steam are fed to the catalyst bed of the reformer and converted into reformate. The steam reforming reactions for methane are shown below.

$$CH_4 + H_2O \leftrightharpoons CO + 3H_2 \quad (1)$$

$$CO + H_2O \leftrightharpoons CO_2 + H_2 \quad (2)$$

The steam reforming reactions with heavier hydrocarbon fuels are:

$$C_nH_m + nH_2O \rightarrow nCO + (m/2+n)H_2 \quad (3)$$

$$CO + 3H_2 \leftrightharpoons CH_4 + H_2O \quad (4)$$

$$CO + H_2O \leftrightharpoons CO_2 + H_2 \quad (2)$$

As can be seen, in steam reforming the water-gas shift reaction (2) occurs with the endothermic reforming reaction (1) or (3). Because the reforming reactions (1) or (3) do not go to completion, fuel will be present in the reformate. For steam reforming of methane this means that methane will be present in the reformate. Methane will also be present in the reformate when steam reforming heavier fuels, due to the methanation reaction (4).

In POX reformers, the fuel in incompletely burned with oxygen or air. The primary reaction for methane and heavier fuels is:

$$2CH_4 + O_2 \rightarrow 2CO + 4H_2 \quad (5)$$

$$C_nH_m + (n/2)O_2 \rightarrow (m/2)H_2 + nCO \quad (6)$$

As in steam reforming, the partial oxidation reactions (5) or (6) do not go to completion and the reformate contains some unreacted fuel. With heavier fuels, the methanation reaction (4) also occurs, so that methane will be present in the reformate, as well. Other reactions, including complete oxidation and/or pyrolysis of the fuel can also occur.

Autothermal reforming employs the partial oxidation reactions (5) or (6) to provide the heat for steam reforming reactions (1), (2) and (3). Fuel, steam and oxygen/air are supplied to the ATR to produce reformate. For the same reasons given above, the ATR reformate will typically contain methane.

The reformate exiting the reformer commonly contains about 10–20% CO, depending on the fuel and type of reformer. The reformate is typically directed to a shift reactor to reduce the concentration of CO and produce additional hydrogen, according to the water-gas shift reaction (2). The water-gas shift reaction is a reversible, exothermic reaction that is limited by thermodynamic equilibrium, with hydrogen formation being favored at lower temperatures. Fuel processing systems often employ cooling of the reformate stream while directing it to two shift catalyst beds. High temperature shift catalysts are capable of reducing the CO concentration of the reformate to about 1–2%. Low temperature shift catalysts can then reduce the CO concentration of the reformate further to about 0.1–0.2%. The shift catalyst beds may be in separate shift reactors or contained in a single reactor, often referred to as a two-stage shift reactor.

Typical fuel cell catalysts are poisoned at such CO concentrations. Therefore, the reformate stream exiting the shift reactor(s) is usually directed to a selective oxidizer to further reduce the concentration of CO. Oxygen or air is added to the reformate stream and CO is oxidized to $CO_2$ in the presence of a selective oxidation catalyst. The following reactions occur in a selective oxidizer:

$$2CO + O_2 \leftrightharpoons 2CO_2 \quad (7)$$

$$2H_2 + O_2 \leftrightharpoons 2H_2O \quad (8)$$

$$CO_2 + H_2 \leftrightharpoons H_2O + CO \quad (9)$$

Some oxidation of hydrocarbons present in the reformate may also occur.

Reaction conditions are controlled to favour desired reaction (7) and to reduce the contribution of the undesired hydrogen oxidation reaction (8) and reverse water-gas shift reaction (9). A selective oxidizer can reduce the concentration of CO in the reformate stream to 10 ppm or less.

Thus, the reformate stream supplied to the fuel cell stack comprises differing amounts of hydrogen, carbon dioxide, carbon monoxide, water vapor, methane and possibly heavier hydrocarbons. The composition of the reformate will depend on such factors as the initial fuel, the selection of fuel processing components, reaction conditions, and the stage of fuel processing.

Figure 2:
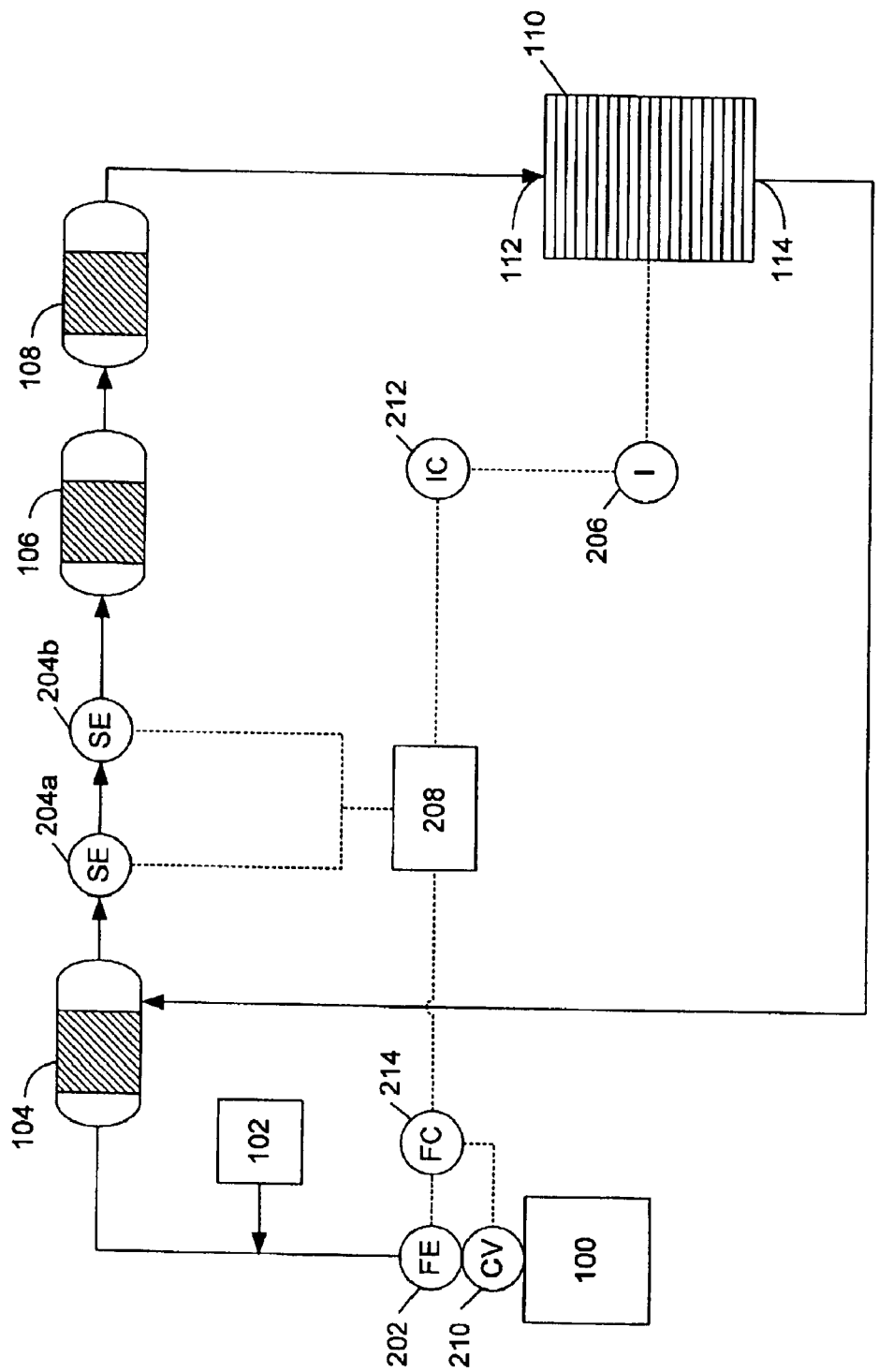
Figure 3:
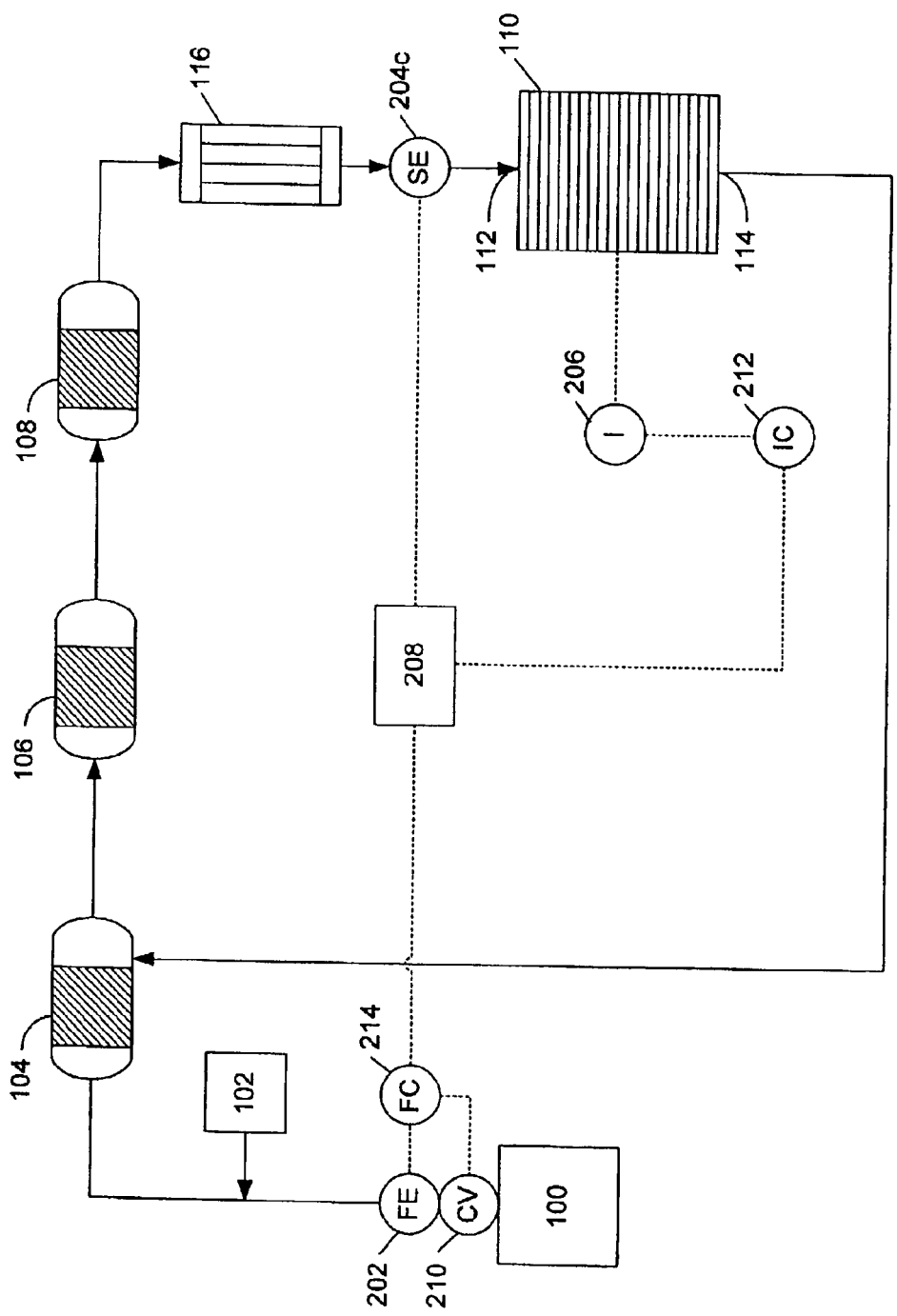

FIGS. 1–3 are simplified and combined process control and process flow diagrams illustrating several embodiments of the present method and apparatus. The fuel cell power generation system of FIGS. 1–3 comprises a steam reformer 104 for converting a fuel from fuel supply 100 and feed water (steam) from water supply 102 into a hydrogen rich reformate stream, and a fuel cell stack 110 configured to receive the reformate stream. For illustration purposes, natural gas (methane) is the fuel employed in the embodiments of FIGS. 1–3.

The reformer 104 comprises a catalyst bed, and a burner (not shown) for heating the reformer 104. As illustrated, steam from water supply 102 is mixed with the fuel upstream of reformer 104. Various other methods and devices for adding steam to the fuel stream may also be implemented, selection of which is not critical to the present invention.

The reformate stream exiting reformer 104 is directed to shift reactor 106 where the water-gas shift reaction (2) reduces the CO concentration in the reformate. If desired, shift reactor may comprise more than one reactor vessel and may also comprise high temperature and low temperature shift catalyst beds, as discussed previously.

The reformate stream exiting shift reactor 106 is directed to selective oxidizer 108 where the CO concentration in the reformate is further reduced. The reformate stream is then directed from selective oxidizer 108 to anode inlet passage 112 of the fuel cell stack 110. Hydrogen in the reformate stream is utilized, or consumed, within the fuel cell stack 110 to generate electrical power. Hydrogen that is not utilized in the fuel cell stack is exhausted from an anode outlet passage 114 as anode exhaust gas. The anode outlet passage 114 is fluidly connected to the burner of the reformer 104, where the anode exhaust is combusted to provide heat.

Other components, such as compressors or heat exchange elements, for example, that are necessary or desirable for operation of the systems of FIGS. 1–3 are not shown, but will be understood by persons skilled in the art to be present.

As has been discussed previously, it is desirable to maintain hydrogen utilization at about a predetermined range or value. Hydrogen utilization is defined herein to mean a ratio of the hydrogen consumed in the fuel cell stack over hydrogen delivered to the fuel cell stack. The predetermined values or ranges of hydrogen utilization can be selected depending on operational characteristics of a particular power generation system. In general, experience has shown that with some embodiments of the power generation system disclosed herein, hydrogen utilization of about 80% is optimal. Utilization rates above about 95% can result in fuel starvation conditions in portions of the fuel cell stack, unstable operation of the power generation system, and reformer burner flame-out, while utilization rates below about 70% can be detrimental to overall power plant efficiency and fuel processing system components.

The concentration of a reformate stream component is measured by sensors 204, 204a, 204b and 204c (discussed in more detail below). The flow rate of fuel is measured by flow detector 202. Using the mass flow rate of the fuel and the concentration of the reformate stream component(s) detected by sensor(s), a hydrogen delivery rate to the fuel cell stack (i.e. hydrogen flow rate in the reformate stream) can be calculated.

Current detector 206 is also provided to detect an output current of the fuel cell stack. A control system processor 208 can then process signals from the current detector 206 and sensor 204 to directly determine a required flow rate of the fuel.

For example, output current is used to determine hydrogen consumed in the fuel cell stack 110. The hydrogen delivery rate should at least match the hydrogen consumption (i.e. 100% hydrogen utilization). However, the required delivery rate will depend on desired hydrogen utilization. For example, 80% hydrogen utilization will require a hydrogen delivery rate that is 125% of the hydrogen consumption rate. As will be appreciated by one skilled in the art, using the sensed concentration of the reformate component(s), a required fuel flow rate can be determined given a selected hydrogen utilization.

As such, in some embodiments of the present method and apparatus, the processor 208 of the control system can be configured to allow a user to select a hydrogen utilization value or range and then to determine a set point for fuel flow rate using the principles described above. The processor 208 will then output a signal to a control valve 210 using a feed back signal from the flow detector 202, to achieve the flow rate set point. The flow rate of steam from water supply 102 should also be controlled to maintain a desired steam:carbon ratio in the reactant stream fed to reformer 104. In FIGS. 1–3, the flow rate of steam from water supply 102 is independently controlled (controller not shown) to maintain the desired steam:carbon ratio. However, if desired, processor 208 could also output a signal to control the steam flow rate set point. As will be apparent to persons skilled in the art, the same considerations apply to the flow rates of other reactants when employing other types of reformers.

In other embodiments, an output current regulator 212 is provided. The processor 208 or controller is configured to determine a maximum allowable load based on the hydrogen delivery rate to the fuel cell stack. As will be appreciated, the hydrogen delivery rate, which is determinable as described above, equates to an allowable output current level. The determined allowable output current level can also be proportionally adjustable depending on a selected hydrogen utilization, such as by 80%, for a desired 80% hydrogen utilization. The output current regulator 212 is then controlled so that the output current matches the allowable output current.

The selection of which reformate component(s) to monitor depends on such factors as the type of components employed in the fuel processing system, the fuel, other feed reactants, and the position of the sensor(s). For purposes of the present method and apparatus, an important consideration in selecting the type and location of the sensor(s) is ensuring that sufficient independent variables are known to calculate a mass balance across the relevant portion of the fuel processing system.

In FIG. 1, sensor 204 measures the concentration of methane in the reformate. Testing has shown that a variety of available on-line infrared (IR) sensors for measuring methane concentration are suitable for purposes of the present invention. Such infrared sensors are widely available for providing sufficiently fast response for the control purposes disclosed herein. Alternatively, sensor 204 may measure the concentration of $CO_2$ in the reformate, if desired.

Under typical steam reforming conditions excess steam is supplied to the reformer, so that water is not a limiting reactant in the reforming reactions. For present purposes, the concentration of carbon monoxide in the reformate exiting the shift reactor is negligible and the water-gas shift reaction (2) can be assumed to go to completion. Accordingly, the overall reaction for the processing of methane by reformer 104 and shift reactor 106 can be written as:

$$CH_4 + 2H_2O \rightleftharpoons CO_2 + 4H_2 \quad (10)$$

Thus, the mass flow rate of fuel into the fuel processing system and the concentration of methane in the reformate downstream of the shift reactor can be used to calculate the hydrogen delivery rate to the stack, based on the mass balance of hydrogen in equation (10). Similarly, the fuel mass flow rate and the concentration of $CO_2$ in the reformate downstream of the shift reactor can be used to calculate the hydrogen delivery rate to the stack, based on the mass balance of carbon.

In another embodiment, reformer 104 in FIG. 1 is a POX reformer or ATR. Sensor 204 may detect methane or $CO_2$, as discussed above. In addition, the mass flow rate of oxygen fed to the reformer is also determined. For example, in applications where air is supplied to the reformer as the oxygen source, the air mass flow rate may be determined by measuring the flow rate of the air stream or by monitoring the air:fuel ratio of the reactant stream fed to the reformer, as desired. Of course, similar considerations also apply where pure oxygen or other oxygen-containing gases are supplied to the reformer. Equation (10), however, will not be valid and the mass balances will be calculated based on the appropriate overall fuel processing equation. Persons of ordinary skill in the art can readily determine the appropriate equation for a given set of fuel processing conditions.

In FIG. 2, sensors 204a and 204b measure the concentration of $CO_2$ and CO in the reformate. The hydrogen delivery rate to the stack can then be calculated based on the mass balance of carbon through reformer 104.

In a further embodiment, reformer 104 in FIG. 2 is a POX reformer or ATR. Sensors 204a and 204b measure the concentration of $CO_2$ and CO, as discussed above. Alternatively, in situations where the amount of complete oxidation of the fuel is minimal, a single CO sensor may be employed with POX reformers. In addition, the mass flow rate of the oxygen-containing reactant fed to the reformer is also determined, as discussed above.

In the foregoing embodiments, the measured concentration of the reformate components is based on the dry composition of the reformate. In alternative embodiments, the concentration of the relevant reformate components can be measured on a wet basis. In such embodiments, the mass flow rate of the feed water supplied to the fuel processing system is also determined and used in mass balance calculations. For example, the mass flow rate of the feed water may be determined by measuring the flow rate of the feed water stream or by monitoring the steam:carbon ratio of the reactant streams fed to the fuel processing components, as desired. In addition, sensor 204 may measure the concentration of methane, $CO_2$ or water, as desired. Sensors 204a and 204b may also measure the concentration of methane and water, respectively, permitting a calculation of the hydrogen mass balance, if desired.

In FIG. 3, condenser 116 receives the reformate stream from selective oxidizer 108, where entrained water is condensed and removed before supplying the reformate to stack 110. The reformate stream exiting condenser 116 can be assumed to be saturated, i.e., at 100% humidity.

Sensor 204c measures the concentration of methane or $CO_2$ in the reformate stream. In order to be able to calculate the hydrogen delivery rate to the stack, the temperature and pressure of the saturated reformate stream are also required. Accordingly, sensor 204c may also detect the temperature and/or pressure of the reformate stream. Alternatively, separate sensors may be employed for this purpose. If desired, reformer 104 in FIG. 3 may be a POX reformer or ATR, in which case the mass flow rate of the oxygen-containing reactant fed to the reformer is also determined.

In FIGS. 1–3, flow detector 202 can be a volumetric flow meter or a direct mass flow meter. As will be apparent to persons skilled in the art, when using volumetric flow meters other process parameters, such as the absolute pressure, differential pressure and temperature of the fuel stream, will also need to be known in order to be able to infer the mass flow rate.

In further embodiments, the volumetric flow rate of the reformate is determined, instead of the fuel mass flow rate. In applications where equation (10) is valid, for example, knowing the volumetric flow rate of the reformate and either the $CO_2$ concentration in the reformate stream, or the concentration of methane and water, permits mass balance calculations and determination of the hydrogen delivery rate to the stack. As another example, a hydrogen sensor could be employed to measure the concentration of hydrogen in the reformate and the hydrogen delivery rate could be calculated directly from the volumetric flow rate of the reformate.

While the foregoing embodiments have been described in relation to methane processing, the present method and apparatus may also be applied to the processing of heavier fuels. In further embodiments, sensors may be employed to measure the concentration of fuel and/or fuel byproducts present in the reformate. Such sensors may be employed instead of, or in addition to, methane sensors, as some methane will typically be present in the reformate even when processing heavier fuels. Again, the selection and location of such sensors are not essential to the present method and apparatus, provided that sufficient independent variables are known to calculate a mass balance across the relevant portion of the fuel processing system.

Some fuels may be mixtures of several components, such as LPG. In still further embodiments, where the concentration of a component of interest in the mass balances of the present invention is not known for the fuel, a sensor could also be employed in the fuel stream. This will provide sufficient information to complete the mass balances described above.

The present method and apparatus may be employed for controlling fuel processing systems where the output demand varies during operation. The selection of fuel cell stacks, fuel processing components and system configuration, and fuel to be utilized in power generation system applications are not essential to the present invention. For example, reformers other than steam reformers may be employed in the fuel processing system. Additional fuel processing components, such as pre-reformers and desulfurization equipment may also be employed.

Although specific embodiments, and examples for the invention are described herein for illustrative purposes, various equivalent modifications can be made without departing from the spirit and scope of the invention, as will be recognized by those skilled in the relevant art. The various embodiments described can be combined to provide further embodiments. The described devices and methods can omit some elements or acts, can add other elements or acts, or can combine the elements or execute the acts in a different order than that illustrated, to achieve various advantages of the invention.

These and other changes can be made to the invention in light of the above detailed description. In general, in the following claims, the terms used should not be construed to limit the invention to the specific embodiments disclosed in the specification. Accordingly, the invention is not limited by the disclosure, but instead its scope is determined entirely by the following claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. employed in the fuel stream. This will provide sufficient information to complete the mass balances described above.

The present method and apparatus may be employed for controlling fuel processing systems where the output demand varies during operation. The selection of fuel cell stacks, fuel processing components and system configuration, and fuel to be utilized in power generation system applications are not essential to the present invention. For example, reformers other than steam reformers may be employed in the fuel processing system. Additional fuel processing components, such as pre-reformers and desulfurization equipment may also be employed.

Although specific embodiments, and examples for the invention are described herein for illustrative purposes, various equivalent modifications can be made without departing from the spirit and scope of the invention, as will be recognized by those skilled in the relevant art. The various embodiments described can be combined to provide further embodiments. The described devices and methods can omit some elements or acts, can add other elements or acts, or can combine the elements or execute the acts in a different order than that illustrated, to achieve various advantages of the invention.

These and other changes can be made to the invention in light of the above detailed description. In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A control system for a fuel cell electric power generation system having a fuel processing system comprising a reformer for converting a reactant stream comprising a hydrocarbon fuel to a reformate stream, and a fuel cell stack fluidly connected to the fuel processing system to receive the reformate stream, the control system comprising:

a current detector for measuring an output current of the fuel cell stack and generating a corresponding current signal;

a first flow detector for measuring a first flow rate of a process gas stream and generating a corresponding first flow rate signal;

a first sensor for measuring a concentration of a first component of the reformate stream and generating a corresponding first concentration signal; and a processor configured to maintain hydrogen utilization in the fuel cell stack at about a user selectable value or within a user selectable range by generating an output signal as a function of the current signal, the flow rate signal and the first concentration signal, the output signal being for use in controlling a process variable impacting hydrogen utilization.

2. The control system of claim 1 wherein the controlled process variable is the output current of the fuel cell stack, the control system further comprising an output current regulator configured to control the output current in response to the output signal from the processor.

3. The control system of claim 1 wherein the controlled process variable is the flow rate of the fuel stream into the reformer, the control system further comprising a flow controller and flow control element configured to control the flow rate of the fuel in response to the output signal from the processor.

4. The control system of claim 1 wherein the processor is configured to maintain hydrogen utilization in the fuel cell stack within a user selected range, the user selected range being between about 75% and about 90%.

5. The control system of claim 1 wherein the processor is configured to maintain hydrogen utilization in the fuel cell stack within a user selected range, the user selected range being between about 80% and about 85%.

6. The control system of claim 1 wherein the processor is configured to maintain hydrogen utilization in the fuel cell stack at about a user selected value, the user selected value being about 80%.

7. The control system of claim 1 wherein the first sensor measures a carbon monoxide concentration.

8. The control system of claim 7, further comprising a second sensor for measuring a concentration of a second component of the reformate stream and generating a corresponding second concentration signal, wherein the output signal is also a function of the second concentration signal.

9. The control system of claim 8 wherein the second sensor measures a carbon dioxide concentration.

10. The control system of claim 1 wherein the fuel processing system further comprises a shift reactor fluidly connected to the reformer for receiving the reformate stream therefrom, wherein the first sensor is located downstream of the shift reactor.

11. The control system of claim 10 wherein the fuel processing system further comprises a selective oxidizer fluidly connected to the shift reactor for receiving the reformate stream therefrom, wherein the first sensor is located downstream of the selective oxidizer.

12. The control system of claim 10 wherein the first sensor measures a methane concentration.

13. The control system of claim 10 wherein the first sensor measures a carbon dioxide concentration.

14. The control system of claim 10 wherein the fuel processing system further comprises a condenser fluidly connected to the shift reactor for receiving the reformate stream therefrom, wherein the first sensor is located downstream of the condenser.

15. The control system of claim 14, further comprising a temperature sensor for measuring a temperature of the reformate stream and generating a corresponding temperature signal, wherein the output signal is also a function of the temperature signal.

16. The control system of claim 14, further comprising a pressure sensor for measuring a pressure of the reformate stream and generating a corresponding pressure signal, wherein the output signal is also a function of the pressure signal.

17. The control system of claim 1 wherein the reactant stream further comprises a feed water stream.

18. The control system of claim 17, further comprising a second flow detector for measuring a second flow rate of the feed water stream and generating a corresponding second flow rate signal, wherein the output signal is also a function of the second flow rate signal.

19. The control system of claim 17, further comprising a monitor for determining a steam:carbon ratio of the reactant stream and generating a corresponding steam:carbon ratio signal, wherein the output signal is also a function of the steam:carbon ratio signal.

20. The control system of claim 17 wherein the first sensor measures a water concentration.

21. The control system of claim 1 wherein the reactant stream further comprises a gas stream comprising oxygen.

22. The control system of claim 21, further comprising a second flow detector for measuring a second flow rate of the gas stream and generating a corresponding second flow rate signal, wherein the output signal is also a function of the second flow rate signal.

23. The control system of claim 21, further comprising a monitor for determining an oxygen-containing gas:fuel ratio of the reactant stream and generating a corresponding gas:fuel ratio signal, wherein the output signal is also a function of the gas:fuel ratio signal.

24. The control system of claim 1 wherein the process gas stream is the fuel.

25. The control system of claim 24 wherein the first flow rate is the mass flow rate of the fuel into the reformer.

26. The control system of claim 1 wherein the process gas stream is the reformate stream and the first flow rate is the volumetric flow rate of the reformate.

27. The control system of claim 26 wherein the first sensor measures a hydrogen concentration.

28. A control system for a fuel cell electric power generation system having a fuel processing system comprising a reformer for converting a reactant stream comprising a hydrocarbon fuel to a reformate stream, and a fuel cell stack fluidly connected to the fuel processing system to receive the reformate stream, the control system comprising:

a current detector for measuring an output current of the fuel cell stack;

a flow detector for measuring a flow rate indicative of a fuel flow rate into the reformer;

a methane sensor for measuring methane concentration in the reformate stream; and a processor for determining hydrogen utilization in the fuel cell stack using signals from the current detector, flow detector, and methane sensor, and for comparing the determined hydrogen utilization against a selectable value and generating a processor signal for adjusting a control variable impacting hydrogen utilization, the processor signal being generated as a function of a difference between the selectable value and the determined hydrogen utilization.

29. The control system of claim 28 further comprising an output current regulator, and wherein the control variable is the output current regulator.

30. The control system of claim 28 further comprising a flow control element for controlling the fuel flow rate into the reformer, wherein the control variable is the flow control element.

31. The control system of claim 28 wherein the selectable value is set between about 80% and about 85%.

32. The control system of claim 28 wherein the selectable value is set at about 80%.

33. A fuel cell electric power generation system comprising:
- a reformer with an inlet passage for receiving a reactant stream comprising a fuel stream and an outlet passage to allow a reformate stream to exit the reformer;
- a fuel cell stack with an anode inlet passage fluidly connected to the outlet passage of the reformer;
- a methane sensor for measuring a concentration of methane in the reformate;
- a flow detector for measuring a flow rate of the fuel stream or the reformate stream;
- a current detector for measuring an output current of the fuel cell stack; and
- a controller configured to process a signal from the methane sensor, a signal from the flow detector, and a signal from the current detector to control a process variable for maintaining hydrogen utilization in the fuel cell stack at about a selectable value or within a selectable range.

34. The power generation system of claim 33 wherein the methane sensor is an IR sensor.

35. The power generation system of claim 33 wherein the process variable is the output current of the fuel cell stack.

36. The power generation system of claim 33 wherein the process variable is the flow rate of the reactant stream.

37. The power generation system of claim 33 wherein the process variable is the flow rate of the fuel stream.

38. The power generation system of claim 33 wherein the selectable range is set at about 70% to about 95%.

39. The power generation system of claim 33 wherein the selectable range is set at about 80% to about 85%.

40. The power generation system of claim 33 wherein the selectable value is set at about 80%.

41. A method of controlling a fuel cell electric power generation system having a fuel processing system comprising a reformer for converting a reactant stream comprising a fuel stream to a reformate stream, and a fuel cell stack fluidly connected to the fuel processing system to receive the reformate stream, the method of control comprising:
- measuring a flow rate of the fuel stream or the reformate stream;
- measuring a methane concentration of the reformate stream using an IR methane sensor;
- calculating a hydrogen flow rate to the fuel cell stack using the measured flow rate and the methane concentration of the reformate stream, and a maximum allowable output current based on the hydrogen flow rate;
- measuring the output current of the fuel cell stack; and
- adjusting the output current of the fuel cell stack to approximately match the maximum allowable output current.

42. The method of claim 41 wherein the maximum allowable output current is determined on the basis of hydrogen utilization by the fuel cell stack of between about 70% and about 95%.

43. The method of claim 41 wherein the maximum allowable output current is determined on the basis of hydrogen utilization by the fuel cell stack of about 90%.

44. The method of claim 41 wherein the maximum allowable output current is determined on the basis of hydrogen utilization by the fuel cell stack of between about 80% and about 85%.

45. A method of controlling a fuel cell electric power generation system having a fuel processing system comprising a reformer for converting a reactant stream comprising a fuel stream to a reformate stream, and a fuel cell stack fluidly connected to the fuel processing system to receive the reformate stream, the method of control comprising:
- measuring a flow rate of the fuel stream or the reformate stream;
- measuring a methane concentration of the reformate stream using an IR methane sensor;
- measuring an output current of the fuel cell stack;
- selecting a hydrogen utilization for the fuel cell stack;
- determining a fuel flow rate set point necessary to achieve the selected hydrogen utilization based on the output current and methane concentration; and
- adjusting the flow rate of the reactant stream or the fuel stream to approximate the fuel flow rate set point.

46. The method of claim 45 wherein the selected hydrogen utilization is between about 70% and about 95%.

47. The method of claim 45 wherein the selected hydrogen utilization is about 90%.

48. The method of claim 45 wherein the selected hydrogen utilization is about 80%.

49. The method of claim 45 wherein the selected hydrogen utilization is about 70%.

* * * * *